(12) United States Patent
Laubender et al.

(10) Patent No.: US 6,610,776 B2
(45) Date of Patent: Aug. 26, 2003

(54) AQUEOUS HIGH GLOSS EMULSION PAINT WITH LONG OPEN TIME

(75) Inventors: Matthias Laubender, Schifferstadt (DE); Frauke Richter, Limburgerhof (DE); Harald Röckel, Neustadt (DE); Maria Gyopar Rau, Hassloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 134 days.

(21) Appl. No.: 09/800,466

(22) Filed: Mar. 8, 2001

(65) Prior Publication Data

US 2001/0031826 A1 Oct. 18, 2001

(30) Foreign Application Priority Data

Mar. 10, 2000 (DE) .......................................... 100 11 643

(51) Int. Cl.⁷ .............................................. C08L 31/00
(52) U.S. Cl. .................... 524/558; 526/320; 526/317.1; 526/318.4; 428/463; 525/296; 525/303
(58) Field of Search .......................... 524/558; 526/320, 526/317.1, 318.4; 428/463; 525/303, 296

(56) References Cited

U.S. PATENT DOCUMENTS

| | | | | |
|---|---|---|---|---|
| 4,465,810 A | * | 8/1984 | Toepker et al. ............. | 525/285 |
| 4,471,100 A | * | 9/1984 | Tsubakimoto et al. ...... | 525/367 |
| 4,569,965 A | * | 2/1986 | Engel et al. ................ | 524/544 |
| 5,118,749 A | | 6/1992 | Knutson ..................... | 524/460 |
| 5,349,036 A | * | 9/1994 | Simpson et al. ............ | 526/320 |
| 5,610,225 A | | 3/1997 | Farwaha et al. ............ | 524/558 |
| 5,959,013 A | * | 9/1999 | Conradi et al. ............. | 524/378 |
| 6,184,268 B1 | * | 2/2001 | Nichols et al. ............. | 523/160 |
| 6,270,905 B1 | * | 8/2001 | Swarup et al. ............. | 428/463 |

FOREIGN PATENT DOCUMENTS

| | | |
|---|---|---|
| EP | 0 422 532 | 4/1991 |
| EP | 0 771 847 | 5/1997 |
| JP | 54-40844 | 3/1979 |
| JP | 6-73328 | 3/1994 |

* cited by examiner

Primary Examiner—David W. Wu
Assistant Examiner—Henry Hu
(74) Attorney, Agent, or Firm—Oblon, Spivak, McClelland, Maier & Neustadt, P.C.

(57) ABSTRACT

The use of an aqueous emulsion paint having a pigment content of from 40 to 200 parts by weight per 100 parts by weight of polymer to coat buildings or building parts, wherein said polymer comprises an emulsion copolymer containing
from 0.5 to 30% by weight of monomers of the formula I

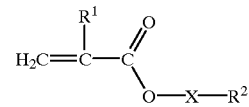

where $R^1$ is a hydrogen atom or a methyl group, X is a divalent organic polyalkylene oxide group comprising from 1 to 50 alkylene oxide units, and $R^2$ is a hydrogen atom or an aliphatic or aromatic hydrocarbon group having 1 to 20 carbon atoms.

17 Claims, No Drawings

AQUEOUS HIGH GLOSS EMULSION PAINT WITH LONG OPEN TIME

The present invention relates to the use of an aqueous emulsion paint having a pigment content of from 40 to 200 parts by weight per 100 parts by weight of polymer to coat buildings or building parts, wherein said polymer comprises an emulsion copolymer containing from 0.5 to 30% by weight of monomers of the formula I

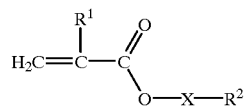

where $R^1$ is a hydrogen atom or a methyl group, X is a divalent organic polyalkylene oxide group comprising from 1 to 50 alkylene oxide units, and $R^2$ is a hydrogen atom or an aliphatic or aromatic hydrocarbon group having 1 to 20 carbon atoms.

The invention further relates to the use of the above emulsion copolymer as a binder for emulsion paints, especially high gloss emulsion paints.

EP-A-37150 discloses aqueous high gloss emulsion paints whose binder comprises an emulsion copolymer based on acrylates, styrene. Polymerization takes place in the presence of an emulsifier having from 60 to 100 ethylene oxide groups. The emulsifier may also be copolymerizable.

EP-A-389179 discloses aqueous dispersions of emulsion copolymers of two-stage construction. Attached to the copolymers, in particular to the core of the copolymer particles, are alkylene oxide chains. Use is made of amphiphilic compounds, e.g., long chain unsaturated alcohols whose alcohol group is alkoxylated, in particular ethoxylated.

EP-A-661306 describes emulsion copolymers for the coating of plastics surfaces, which comprise ethoxylated (meth)acrylic esters. The coating obtained has improved performance properties, in particular an improved chemical resistance.

For the processing of emulsion paints, especially high gloss emulsion paints, it is important to maximize the open time. The open time is the time within which the emulsion paint remains processible so that irregularities in the surface of the coating following application to substrates can still be retouched. The open time possesses particular significance in connection with substrates of large surface area, such as in the construction industry, for example. In the case of coatings on building parts, e.g., internal walls, wood paneling, etc., a uniform appearance is a particular requirement. To achieve this, it must be possible to retouch and adapt the coating for as long as possible after the entire area or part thereof has been completed.

It is an object of the present invention to provide emulsion paints, especially high gloss emulsion paints, having an open time which is as long as possible.

We have found that this object is achieved by the emulsion paint defined at the outset.

Essential constituents of the aqueous emulsion paint used in accordance with the invention include a polymer as binder, and a pigment.

The polymer comprises an emulsion copolymer containing from 0.5 to 30% by weight of monomers of the formula I.

The emulsion copolymer preferably contains at least 1% by weight, with particular preference at least 2% by weight, of monomers of the formula I. In general, the amount of monomers I need not exceed 20% by weight, in particular 15% by weight, in order to achieve the desired properties, in particular a long open time.

In the formula I, X is preferably a polyalkylene oxide group comprising ethylene oxide units, propylene oxide units, or mixtures of ethylene oxide and propylene oxide units. Ethylene oxide units and propylene oxide units may alternate, for example, or may be present in the form of polyethylene oxide and/or polypropylene oxide blocks.

The polyalkylene oxide group preferably comprises not more than 40, with particular preference not more than 30, with very particular preference not more than 20, alkylene oxide units.

The polyalkylene oxide group preferably comprises at least two, in particular at least 3, and with very particular preference at least 4, alkylene oxide groups.

The radical $R^2$ is preferably a hydrogen atom or a hydrocarbon group having 1 to 10 carbon atoms; with particular preference, $R^2$ is a $C_1$ to $C_8$ alkyl group, in particular a $C_1$ to $C_4$ alkyl group, or a hydrogen atom.

Particularly preferred monomers of the formula I are, for example, compounds of the formula II

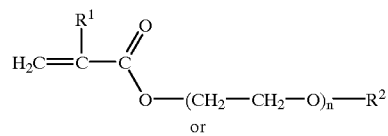

or

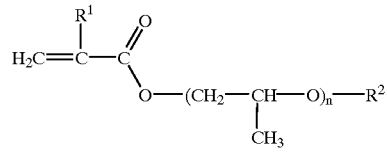

where $R^1$ and $R^2$ are as defined above in their preferred definitions and n is an integer from 1 to 20, in particular from 3 to 15, and with particular preference from 4 to 12.

Preferably, the emulsion copolymer comprises in total
a) from 40 to 99.5% by weight of principal monomers selected from
$C_1$ to $C_{18}$ alkyl (meth)acrylates, vinylaromatic compounds having up to 20 carbon atoms, vinyl esters of carboxylic acids having 1 to 20 carbon atoms, vinyl halides, vinyl ethers, ethylenically unsaturated nitriles, nonaromatic hydrocarbons having 2 to 8 carbon atoms and 1 or 2 double bonds,
b) from 0.5 to 30% by weight of monomers of the formula I,
c) from 0 to 50% by weight of further monomers.

With particular preference, the emulsion copolymer comprises
a) from 50 to 98% by weight of principal monomers,
b) from 2 to 20% by weight of monomers of formula I, and
c) from 0 to 40% by weight of further monomers.

With very particular preference, the emulsion copolymer comprises
a) from 60 to 97% by weight of principal monomers,
b) from 3 to 15% by weight of monomers of formula I, and
c) from 0 to 30% by weight of further monomers.

Examples of principal monomers are $C_1$–$C_8$ alkyl (meth)acrylates such as methyl methacrylate, methyl acrylate, n-butyl acrylate, ethyl acrylate, and 2-ethylhexyl acrylate.

In particular, mixtures of the alkyl (meth)acrylates are also suitable.

Vinyl esters of carboxylic acids having 1 to 20 carbon atoms are, for example, vinyl laurate, vinyl stearate, vinyl propionate, versatic acid vinyl ester, and vinyl acetate.

Suitable vinylaromatic compounds include vinyltoluene, α- and p-methylstyrene, α-butylstyrene, 4-n-butylstyrene, 4-n-decylstyrene and, preferably, styrene.

Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether or vinyl isobutyl ether. Preference is given to vinyl ethers of alcohols containing from 1 to 4 carbon atoms.

Hydrocarbons having 2 to 8 carbon atoms and one or two olefinic double bonds that may be mentioned include butadiene, isoprene and chloroprene; those having one double bond are, for example, ethene or propene.

Preferred principal monomers are the alkyl (meth) acrylates, especially the $C_1$–$C_8$ alkyl (meth)acrylates, vinylaromatic compounds having up to 20 carbon atoms, especially styrene, and mixtures of the aforementiond monomers.

Further monomers are, for example, hydroxyl-containing monomers, especially $C_1$–$C_{10}$ hydroxyalkyl (meth) acrylates, (meth)acrylamide, ethylenically unsaturated acids, especially carboxylic acids, such as (meth)acrylic acid or itaconic acid, and their anhydrides, dicarboxylic acids and their anhydrides or monoesters, examples being maleic acid, fumaric acid, and maleic anhydride.

The emulsion copolymer preferably has a glass transition temperature Tg of less than 30° C., with particular preference less than 25° C.

In particular, the Tg is, for example, from −20 to +20° C., with particular preference from 0 to 20° C., and with very particular preference from 10 to 20° C.

The glass transition temmperature $T_g$ here is the midpoint temperature determined by differential thermal analysis (DSC) in accordance with ASTM D 3418-82 (cf. Ullmann's Encyclopedia of Industrial Chemistry, 5th Edition, Volume A 21, VCH Weinheim 1992, p. 169 and also Zosel, Farbe und Lack 82 (1976), pp. 125–134; see also DIN 53765).

According to Fox (see Ullmanns Enzyklopädie der technischen Chemie, $4^{th}$ edition, Volume 19, Weinheim (1980), p. 17, 18) it is possible to estimate the glass transition temperature $T_g$. For the glass transition temperature of copolymers with little or no crosslinking, at high molecular masses, it is the case in good approximation that:

$$\frac{1}{T_g} = \frac{X^1}{T_g^1} + \frac{X^2}{T_g^2} + \ldots \frac{X^n}{T_g^n}$$

where $X^1$, $X^2$, . . . , $X^n$ are the mass fractions of the monomers 1, 2, . . . , n and $T_g^1$, $T_g^2$, . . . , $T_g^n$ are the glass transition temperatures of the homopolymers of each of the monomers 1, 2, . . . , n, in degrees Kelvin. The latter are known, for example, from Ullmann's Encyclopedia of Industrial Chemistry, VCH, $5^{th}$ edition, Weinheim, Vol. A 21 (1992) p. 169, or from J. Brandrup, E. H. Immergut, Polymer Handbook $3^{rd}$ ed, J. Wiley, New York 1989.

The emulsion copolymer may be prepared in a known manner by emulsion polymerization.

In the course of the emulsion polymerization it is common to use ionic and/or nonionic emulsifiers and/or protective colloids and/or stabilizers as surface-active compounds.

A detailed description of appropriate protective colloids can be found in Houben-Weyl, Methoden der organischen Chemie, Volume XIV/1, Makromolekulare Stoffe [macromolecular substances], Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights—unlike those of the protective colloids—are usually below 2000 g/mol. Where mixtures of surface-active substances are used, the individual components must of course be compatible with one another, which in case of doubt can be checked by means of a few preliminary tests. Preference is given to the use of anionic and nonionic emulsifiers as surface-active substances. Common accompanying emulsifiers are, for example, ethoxylated fatty alcohols (EO units: from 3 to 50, alkyl: $C_8$ to $C_{36}$), ethoxylated mono-, di- and trialkylphenols (EO units: from 3 to 50, alkyl: $C_4$ to $C_9$), alkali metal salts of dialkyl esters of sulfosuccinic acid and also alkali metal and ammonium salts of alkyl sulfates (alkyl: $C_8$ to $C_{12}$), of ethoxylated alkanols (EO units: from 4 to 30, alkyl: $C_{12}$ to $C_{18}$), of ethoxylated alkylphenols (EO units: from 3 to 50, alkyl: $C_4$ to $C_9$), of alkylsulfonic acids (alkyl: $C_{12}$ to $C_{18}$), of alkylarylsulfonic acids (alkyl: $C_9$ to $C_{18}$) and of sulfates of ethoxylated fatty alcohols.

Appropriate emulsifiers can also be found in Houben-Weyl, op. cit., pages 192 to 208.

Examples of commercial names of emulsifiers are Dowfax® 2 Al, Emulan® NP 50, Dextrol® OC 50, Emulgator 825, Emulgator 825 S, Emulan® OG, Texapon® NSO, Nekanil® 904 S, Lumiten® I-RA, Lumiten E 3065 etc.

The surface-active substance is used usually in amounts of from 0.1 to 10% by weight, based on all the monomers to be polymerized.

Water soluble initiators for the emulsion polymerization are, for example, ammonium salts and alkali metal salts of peroxydisulfuric acid, e.g., sodium peroxydisulfate, hydrogen peroxide, or organic peroxides, e.g., tert-butyl hydroperoxide. Particularly suitable are what are known as reduction-oxidation (redox) initiator systems.

The redox initiator systems comprise at least one, usually inorganic, reducing agent, and an organic or inorganic oxidizing agent.

The oxidizing component comprises, for example, the initiators customarily used for emulsion polymerization.

The reduction components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethylsulfinic acid and its salts, or ascorbic acid. The redox initiator systems may be used together with soluble metal compounds whose metallic component is able to exist in a plurality of valence states.

Customary redox initiator systems are, for example, ascorbic acid/iron(II)sulfate/sodium peroxodisulfate, tert-butyl hydroperoxide/sodium disulfite, tert-butyl hydroperoxide/Na hydroxymethanesulfinate. The individual components, e.g., the reduction component, may also be mixtures, for example, a mixture of the sodium salt of hydroxymethanesulfinic acid with sodium disulfite.

The amount of the initiators is generally from 0.1 to 10% by weight, preferably from 0.2 to 5% by weight, based on all the monomers to be polymerized. It is also possible to use two or more different initiators for the emulsion polymerization.

The emulsion polymerization generally takes place at from 30 to 150° C., preferably from 50 to 95° C. The polymerization medium may consist either of water alone or of mixtures of water and water miscible liquids such as methanol. Preferably, water alone is used. The emulsion polymerization may be conducted either as a batch process or in the form of a feed process, including staged or gradient procedures. Preference is given to the feed process, in which a portion of the polymerization mixture or else a polymer seed is introduced as initial charge and heated to the polymerization temperature, polymerization is begun, and then the remainder of the polymerization mixture is supplied to the polymerization zone during ongoing polymerization, continuously, in stages, or subject to a concentration gradient, usually by way of two or more spatially separate feed streams, of which one or more comprise the monomers in pure or in emulsified form.

The manner in which the initiator is added to the polymerization vessel in the course of the free radical aqueous emulsion polymerization is known to the skilled worker. It may either be included in its entirety in the initial charge to the polymerization vessel or else introduced, continuously or in stages, at the rate at which it is consumed in the course of the free radical aqueous emulsion polymerization. Specifically this will depend, in a manner known per se to the skilled worker, both on the chemical nature of the initiator system and on the polymerization temperature. Preferably, a portion is introduced as the initial charge and the remainder is supplied to the polymerization zone at the rate at which it is consumed.

For the purpose of removing the residual monomers, it is also possible to add initiator after the end of the emulsion polymerization proper, i.e., following a monomer conversion of at least 95%.

The product is an aqueous polymer dispersion which usually has a polymer content (solids content) of from 20 to 70% by weight, preferably from 40 to 60% by weight, based on the polymer dispersion.

In the emulsion paint, the polymer or emulsion copolymer acts as binder.

The emulsion paint further comprises a pigment. The term pigment is a comprehensive one, embracing all pigments and fillers/extenders, e.g., color pigments, white pigments, and inorganic fillers.

Mention may be made of inorganic white pigments such as titanium dioxide, preferably in the rutile form, barium sulfate, zinc oxide, zinc sulfide, basic lead carbonate, antimony trioxide, and lithopones (zinc sulfide+barium sulfate), or colored pigments, examples being iron oxides, carbon black, graphite, zinc yellow, zinc green, ultramarine, manganese black, antimony black, manganese violet, Paris blue or Schweinfurter green. Besides the inorganic pigments, the emulsion paints of the invention may also comprise organic color pigments, examples being sepia, gamboge, Kassel brown, toluidine red, para red, Hansa yellow, indigo, azodyes, anthroquinoid and indigooid dyes, and also dioxazine, quinacridone, phthalocyanine, isoindolinone and metal complex pigments.

Examples of suitable fillers include alumosilicates, such as feldspars, silicates, such as kaolin, talc, mica, magnesite, alkaline earth metal carbonates, such as calcium carbonate in the form, for exampmle, of calcite or chalk, magnesium carbonate, dolomite, alkaline earth metal sulfates, such as calcium sulfate, silicon dioxide, etc. The fillers may be used as individual components. In practice, however, filler mixtures have proven particularly suitable, examples being calcium carbonate/kaolin and calcium carbonate/talc. Dispersion based plasters may also comprise relatively coarse aggregates, such as sands or sandstone granules. In emulsion paints, of course, finely divided fillers are preferred. For the purpose of modifying the surface gloss and perceived color of the paint, the emulsion paints of the invention may also comprise particulate, nonfilm-forming polymers, e.g., polystyrene dispersions.

To increase the hiding power and to save on the use of white pigments it is common in the preferred emulsion paints to use finely divided fillers, e.g., finely divided calcium carbonate, or mixtures of different calcium carbonates with different particle sizes. To adjust the hiding power, the shade and the depth of color it is preferred to employ blends of color pigments and extenders.

The pigment content is preferably from 40 to 200 parts by weight of pigment per 100 parts by weight of polymer. Preferably, the pigment content is from 45 to 160 parts by weight, with particular preference from 55 to 130 parts by weight, per 100 parts by weight of polymer.

Besides the polymer and pigment, the aqueous emulsion paint of the invention may comprise further auxiliaries.

The customary auxiliaries include not only the emulsifiers used during the polymerization but also wetting agents or dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and also naphthalenesulfonic salts, especially the sodium salts thereof.

Mention may also be made of leveling agents, defoamers, biocides, and thickeners.

Examples of suitable thickeners include associative thickeners.

Preferred associative thickeners are polyurethane thickeners.

The amount of the thickener is preferably from 0.5 to 5 parts by weight, with particular preference from 0.5 to 2.5 parts by weight, per 100 parts by weight of polymer.

The emulsion paint of the invention is prepared in a known manner by blending the components in mixing equipment suitable for the purpose. It has been found suitable to prepare an aqueous paste or dispersion from the pigments, water and, if appropriate, the auxiliaries, and only then to mix the polymeric binder—i.e., generally the aqueous dispersion of the polymer—with the pigment paste or pigment dispersion.

The emulsion paints of the invention generally contain from 30 to 75% by weight and, preferably, from 40 to 65% by weight of nonvolatile constituents. These are all constituents of the formulation other than water, but at least the total amount of binder, pigment, emulsifiers, and thickener. The volatile constituents predominantly comprise water.

The emulsion paint is preferably a high gloss emulsion paint.

The gloss of the emulsion paint is determined in accordance with DIN 67530: the paint is applied to the test sheet in a (wet) film thickness of 240 μm and is dried at room temperature for 72 hours. The test specimen is inserted into a calibrated reflectometer and, at a defined angle of incidence, a note is made of the extent to which the light thrown back has been reflected or scattered. The reflectometer value found is a measure of the gloss (the higher the value, the higher the gloss).

The gloss of the high gloss emulsion paint is preferably greater than 40 at 20° and greater than 70 at 60°; with particular preference, the gloss is greater than 50 at 20° and greater than 80 at 60°.

The reflectometer value is determined at 21° C. and stated in dimensionless units as a function of the incident angle, e.g., 40 at 20°.

The emulsion paint may be applied conventionally to substrates, by brushing, rolling, knifecoating, etc., for example.

In accordance with the invention, the emulsion paint is used to coat buildings or building parts. These may comprise mineral substrates such as plasters or concrete, wood, metal or paper, e.g., wallpapers.

The parts to be coated are preferably parts of large surface area, the area to be coated being at least 1 and in particular at least 2 m².

The emulsion paint is preferably used for internal building parts, e.g., internal walls, internal doors, paneling, bannisters, etc.

The emulsion paints have good performance properties, examples being their good water resistance, good wet adhesion, including their wet adhesion to alkyd paints, good blocking resistance, good overcoatability, and good leveling in the course of application.

In particular, the emulsion paints have a long open time.

EXAMPLES

I Preparing the Polymer Dispersion

Preparation was in accordance with the following general preparation procedure:

A polymerization vessel was charged with a mixture of

| | |
|---|---|
| 200 g | Water |
| 33.8 g | A 33% strength by weight solution of a polystyrene seed (average particle size 30 nm) | and this initial charge was heated to 85° C. with stirring. Subsequently, with the 85° C. being maintained, feedstream 1 was run in over the course of 3 h, the first 20 minutes taking place at half feed speed, and the remainder of feedstream 2 was run in (beginning simultaneously with feedstream 1) over the course of 3 h 15 min. After the end of feedstream 2, feedstream 3 was added to the polymerization mixture and then polymerization was continued at 85° C. for 30 min. Subsequently, the batch was cooled to 70° C. and, in order to reduce the residual monomers, feedstream 4 was run in, and also feedstream 5 was added continuously over 30 min. The batch was subsequently cooled.

Feedstream 1:

| | |
|---|---|
| 243 g | Water |
| 11.3 g | A 20% strength by weight solution of ethoxylated fatty alcohol (alkyl: $C_{16}/C_{18}$ mixture, average EO units: 18) |
| 60 g | A 15% strength by weight aqueous solution of sodium lauryl sulfate |
| 9 g | Methacrylic acid |
| X | Methyl methacrylate (MMA) |
| Y g | n-Butyl acrylate (BA) |
| Z g | Methyl-capped polyethylene glycol methacrylate (60/100% strength by weight solution) (Bisomer ® MPEG) |

Feedstream 2:

| | |
|---|---|
| 34 g | Water |
| 1.8 g | Sodium peroxydisulfate |

Feedstream 3:

| | |
|---|---|
| 3.2 g | 25% strength by weight aqueous ammonia solution |

Feedstream 4:

| | |
|---|---|
| 1 g | 70% strength by weight t-butyl hydroperoxide solution |
| 3.5 g | Water |

Feedstream 5:

| | |
|---|---|
| 8.9 g | 13.1% strength by weight acetone bisulfite solution |
| 9 g | Water |

The amounts of MMA, BA and MPEG in the feedstreams are given in the following table:

| Example | MMA | BA | MPEG | average degree of ethoxylation of the MPEG | MPEG in the polymer* |
|---|---|---|---|---|---|
| E1 | 189 g | 252 g | — | — | — |
| E2 | 189 g | 234 g | 18 g (100%) | 7–8 | 4% Bisomer MPEG 350 MA |
| E3 | 189 g | 229,5 g | 22,5 (100%) | 7–8 | 5% Bisomer MPEG 350 MA |
| E4 | 189 g | 220,5 g | 31.5 (100%) | 7–8 | 7% Bisomer MPEG 350 MA |
| E5 | 184,5 g | 245 g | 11 g (100%) | 7–8 | 2.5% Bisomer MPEG 350 MA |
| E6 | 184,5 g | 245 g | 18.5 g (60%) | 22–23 | 2.5% Bisomer S 10 w |
| E7 | 184,5 g | 245 g | 18.5 g (60%) | 45 | 2,5% Bisomer S 20 W |

*in % by weight

The methyl-capped polyethylene glycol methacrylates used were products (Bisomers®) from Inspec Specialities, the Bisomers used in accordance with the above table differing only in the degree of ethoxylation.

II Preparing High Gloss Paints

High gloss paints were formulated from the aqueous polymer dispersions E1–E7. For this purpose, pigment pastes as described below were first prepared and then were blended with the binder (formulations F1–F3). The composition is indicated in the table below:

| | F1 | F2 | F3 |
|---|---|---|---|
| Water | 34.8 | 20 | 20 |
| Surfynol 104/50% [1] | 2.8 | — | — |
| Tegowet 250 [2] | 1.8 | — | — |
| Agitan E 255 [3] | — | 1.5 | 1 |
| Strodex MOK 70 [4] | 1.5 | — | — |
| Collacral LR 8954/30% [5] | 15 | — | — |
| Pigmentverteiler MD 20/25% [6] | — | 10 | 10 |
| Rheolate 208/5% [7] | — | — | 120 |
| Fatty alcohol ethoxylate urethane | 7.8* | 120 ** | — |
| Kronos Titan 2063 S | 152.5 | 230 | 230 |
| Byk 306 [8] | 2.1 | — | — |

-continued

|  | F1 | F2 | F3 |
|---|---|---|---|
| Water | — | 88.5 | 88.5 |
| Dispersion 45% | 530 | 530 | 530 |

\* 20% strength solution;
\*\* 5% strength solution
[1] Defoamer from Air Products
[2] Wetting agent from Tego Chemie Service GmbH
[3] Defoamer from Münzing Chemie GmbH
[4] Dispersant from Dexter Chemical Corp. USA
[5] Pigment dispersant from BASF
[6] Pigment dispersant: sodium salt of a maleic anhydride-diisobutene copolymer (BASF)
[7] Associative thickener from Rheox GmbH
[8] Defoamer from Byk-Chemie GmbH III Performance Testing Determining the Open Time:

The open time was determined by the knifecoater method. For this purpose, the paint is applied at a wet film thickness of 240 μm to a Leneta sheet and at defined intervals of time during the drying of the film is disrupted down to the substrate using a 200 μm metal spiral. When drying is complete, the quality of the film surface is assessed and a record is made of two points in time. The first value is the time after which no traces of the spiral can be seen. The second value is the time after which the knife furrows can clearly be seen. The knifecoater method is therefore defined by way of the leveling.

Conducting Gloss Measurements:

240 μm wet film thicknesses of the formulated paints were applied to a glass plate. After filming at 23° C. for 24 h, the degree of gloss of the film was determined at observation angles of 20° and 60°, using a Micro-TRI-gloss reflectometer from Byk-Gardner, at 3 measurement points picked at random from the film surface. The figure reported is the mean of 3 determinations.

Conducting the Viscosity Measurements:

The flow curves were measured using a Physika DSR 4000/5000 MK 22 rheometer in a shear range from 0–10,000 l/s. The table reports the values for 102 l/s in [mPas].

Results

| Example | F1 open time [min] | F2 open time [min] | F1 viscosity 102 1/s [mPas] | F2 viscosity 102 1/s [mPas] | F1 gloss 20°/60° | F2 gloss 20°/60° |
|---|---|---|---|---|---|---|
| E 1 | 24/26 | 19/21 | 481 | 928 | 67/86 | 29/69 |
| E 2 | 34/36 | 28/33 | 86 | 576 | 68/85 | 37/73 |
| E 3 | 33/36 | 27/29 | 87 | 618 | 68/85 | 42/76 |
| E 4 | 34/36 | 28/33 | 95 | 915 | 67/86 | 50/78 |

From the viscosities from E1 and E4 in the case of the formulation F2 it is evident that the prolongation of the open time cannot be attributed to the effect of the viscosity but is unambiguously an effect of the methyl-capped polyethylene glycol methacrylates added. The open time is 33–34 minutes and, respectively, 27–28 minutes relative to the blank sample at 24 and, respectively, 19 minutes, as a function of the formulation.

It is also evident that the effect of the prolongation of the open time depends on the chain length of the EO units and decreases as the chain length goes up. The gloss, on the other hand, shows no significant change.

| Example | F3 open time [min] | F3 gloss 20°/60° |
|---|---|---|
| E 5 | 9/12 | 61/84 |
| E 6 | 6/10 | 64/85 |
| E 7 | 0/2 | 62/83 |

We claim:

1. A method of coating buildings or building parts, comprising;
applying an aqueous emulsion paint having a pigment content ranging from 40 to 200 parts by weight per 100 parts by weight of polymer and an emulsion copolymer which contains monomer units of formula I

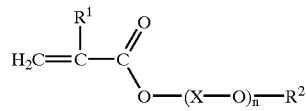

wherein $R^1$ is hydrogen or methyl, —X—O— is a divalent organic alkylene oxide group, n is an integer ranging from 1 to 50 and $R^2$ is hydrogen or an aliphatic or aromatic hydrocarbon group having from 1 to 20 carbon atoms, in an amount of 0.5 to 30% by wt of the copolymer, as a coating on the surfaces of buildings or building components.

2. The method as claimed in claim 1, wherein the alkylene oxide units comprise ethylene oxide units, propylene units, or mixtures of ethylene oxide and propylene oxide units.

3. The method as claimed in claim 1, wherein $R^2$ is a $C_1$ to $C_4$ alkyl group.

4. The method as claimed in claim 1, wherein the polymer is composed of
a) from 40 to 99.5% by weight of a $C_1$ to $C_8$ alkyl (meth)acrylate, of a vinylaromatic compound having up to 20 carbon atoms, or of mixtures thereof;
b) from 0.5 to 30% by weight of a monomer of formula I; and
c) from 0 to 50% by weight of further monomers.

5. The method as claimed in claim 1, wherein the glass transition temperature of the emulsion copolymer is less than 30° C.

6. The method as claimed in claim 1, wherein the emulsion paint comprises a thickener selected from the group consisting of associative thickeners.

7. The method as claimed in claim 1, wherein said paint is a high gloss emulsion paint having a gloss of more than 40 at 20° and more than 70 at 60° (° is the angle of incidence).

8. The method as claimed in claim 4, wherein said $C_1$ to $C_8$ alkyl (meth)acrylate is methyl methacrylate, methyl acrylate, n-butyl acrylate, ethyl acrylate and 2-ethylhexyl acrylate.

9. The method as claimed in claim 4, wherein said vinylaromatic compound is styrene, vinyltoluene, α- and p-methylstyrene, α-butylstyrene, 4-n-butylstyrene or 4-n-decylstyrene.

10. A method of coating substrates, comprising:
applying the emulsion paint of claim 1 to substrates of wood, metal, minerals or wallpaper.

11. A method of coating substrates, comprising:
applying the emulsion paint of claim 1 to internal walls of houses or internal building parts thereof.

12. The method according to claim 1, wherein the internal parts are wooden beams and paneling.

13. The method as claimed in claim 1, wherein the value of n ranges from 1 to 20.

14. The method as claimed in claim 13, wherein the value of n ranges from 3 to 15.

15. An aqueous emulsion paint, comprising:
an emulsion copolymer and a pigment, said copolymer having a glass transition temperature of less than 30° C. and being composed of:
a) from 40 to 99.5% by weight of a $C_1$ to $C_8$ alkyl (meth)acrylate, of a vinylaromatic compound, or of mixtures thereof;
b) from 0.5 to 30% by weight of a monomer of formula I; and
c) from 0 to 50% by weight of an additional monomer; said paint containing from 40 to 200 parts by weight of pigment per 100 parts by weight of said copolymer.

16. The aqueous emulsion paint as claimed in claim 15, which further comprises a thickener selected from the group consisting of associative thickeners.

17. A method of coating buildings or building parts, comprising;
applying an aqueous emulsion paint having a pigment content ranging from 40 to 200 parts by weight per 100 parts by weight of polymer and an emulsion copolymer that is prepared by copolymerizing a monomer of formula I $$H_2C=C(R^1)-C(=O)-O-(X-O)_n-R^2$$

wherein $R^1$ is hydrogen or methyl, —X—O— is a divalent organic alkylene oxide group, n is an integer ranging from 1 to 50 and $R^2$ is hydrogen or an aliphatic or aromatic hydrocarbon group having from 1 to 20 carbon atoms, in an amount of 0.5 to 30% by wt of the copolymer, with at least one ethylenically unsaturated comonomer in an amount of 40 to 99.5% by weight in an aqueous emulsion containing a free radical initiator, as a coating on the surfaces of buildings or building components.

\* \* \* \* \*